May 17, 1966     J. E. GEUSIC ETAL     3,252,103
Nd³⁺-YAG LASER AMPLIFIER AND OSCILLATOR
Filed May 14, 1964     2 Sheets-Sheet 1

INVENTORS *J. E. GEUSIC*
*L. G. VAN UITERT*
BY
ATTORNEY

United States Patent Office 3,252,103
Patented May 17, 1966

3,252,103
$Nd^{3+}$-YAG LASER AMPLIFIER AND OSCILLATOR
Joseph E. Geusic, Berkeley Heights, and Le Grand G. Van Uitert, Morris Township, Morris County, N.J., assignors to Bell Telephone Laboratories, Incorporated, New York, N.Y., a corporation of New York
Filed May 14, 1964, Ser. No. 367,306
10 Claims. (Cl. 330—4.3)

This invention relates to lasers utilizing as their active elements crystalline bodies of neodymium-containing yttrium aluminum garnet ($Y_3Al_5O_{12}$) (YAG). These devices are particularly suitable for continuous operation.

In recent years considerable attention has been focused on a class of solid state lasers which are capable of generating or amplifying coherent electromagnetic wave energy in the optical frequency range. Devices of this type, which are described, for example, in United States Patent No. 2,929,922, issued to Schawlow and Townes, are considered to be operable over the spectral range from far infrared to ultraviolet, a frequency range of about $10^{15}$ cycles.

The operating principle of the solid state laser is so well understood at the time of this filing as to render its description unnecessary to this discussion. The active ion utilized in the lasers of this invention is neodymium in the 3+ valence state. This ion, the only one reported as having gone C.W. at room temperature (in calcium tungstate), is known to be characterized by at least four distinct energy levels and as having emission lines at about 1 micron, resulting from a transition to an elevated ground state. The Nd-YAG system is not fundamentally different from the $Nd-CaWO_4$ system in this respect, the most intense fluorescence lines in YAG occurring between 1.05 microns and 1.08 microns. The advantages inherent in any four-level system are retained. Laser action has been reported for a host of other materials containing Nd, even including inorganic and organic glasses.

Based on the above, it could have been predicted that Nd-containing YAG would show stimulated emission in the infrared with an appropriate pump. Despite this fact, the literature is devoid of any reference to any experiments utilizing this material. The reason is clear. While YAG of gem-like appearance was grown by spontaneous nucleation several years ago, the techniques then used are not appropriately directed to the growth of sections of sufficient length for laser use. The very high melting point of this material (about 2000° C.), the resulting difficulty in finding stable crucible materials and the absence of any defined need for the material explain the lack of interest in improved growth techniques.

Continuous, intensive study made on small samples of YAG over the course of years by the inventors herein has resulted in the indication of a unique combination of characteristics advantageously adapted to laser devices. These findings, in turn, inspired parallel investigations, two of which have resulted in techniques for the growth of suitable specimens of YAG for device use. This combination of characteristics has to date resulted in room temperature C.W. operation with a 360 watt tungsten pump, as contrasted with the need for about a 4000 watt mercury lamp for room temperature C.W. operation of a comparable $Nd-CaWO_4$ crystal. These characteristics are:

(1) Improved line width —6.5 cm.$^{-1}$ for the most intense line at 1.0648 microns at room temperature (about 21 cm.$^{-1}$ in $CaWO_4$) so providing for a three-fold reduction in threshold;

(2) Good optical properties—stable, hard, isotropic, accepts large concentrations of trivalent Nd substitutionally, resulting in improvement over $CaWO_4$ by a factor of from 2 to 3; and (3) Improved absorption, as compared with $Nd^{3+}CaWO_4$ Of these characteristics, the third is the most striking, as will be discussed in some detail in conjunction with FIGS. 3A and 3B. While YAG can be pumped as efficiently as calcium tungstate by mercury, study of the absorption spectra revelas an advantage for a tungsten pump of the order of 250%, as contrasted with only an indicated 25% improvement for tungsten in the tungstate system. In fact, the absorption spectrum for Nd in YAG is unlike that of Nd in other reported hosts, all of which, including Nd-glass, are similar to that of $Nd-CaWO_4$. Of course, the 25% or so improvement indicated for a tungsten pump by the usual absorption spectrum for $Nd^{3+}$ is of little significance for the best threshold values thus far recorded due to the unattainability of tungsten or other black body emitters at the required power levels.

The combined effect of the three recited characteristics is a reduction in threshold level by greater than an order of magnitude over optium $Nd^{3+}-CaWO_4$. This results in greater output at any given pump level.

While it is difficult to think beyond these very exciting prospects, which for the first time make possible the fruition of many of the ambitions expressed for the laser at the time of its invention, the unusually advantageous combination of properties for this material makes possible applications in addition to C.W. room temperature operation with commercially available black body emitters. The line width of 6.5 cm.$^{-1}$ at room temperature is reduced to of the order of from 1 to 1.5 cm.$^{-1}$ at liquid nitrogen. This still further reduced line width, together with the other properties which are retained at low temperature, results in the feasible operation of a C.W. amplifier showing appreciable insertion gain for crystal lengths of 1 or 2 inches.

The discussion of the unusual effectiveness of these devices has been largely in terms of the very low thresholds realized. For communications and for most other uses, low threshold is perhaps no more than a first, albeit most important, factor, indicating higher power output with increased pump energy. It is found that in common with other systems investigated, output energy is for these devices a linear function of pump level. The slope of the curve showing this relationship is, in turn, dependent on a number of factors including end reflectivity, optical perfection, etc. Experiments thus far studied make possible the attainment of output levels of the order of one-half watt with a 650 watt tungsten pump. The feasibility of C.W. room temperature operation at this level has not been indicated with any other system.

In accordance with this invention, it has been found that the system $Nd^{3+}$-YAG containing from one-half to 10 atom percent Nd based on the number of yttrium atoms is possessed of an unusual combination of characteristics indicating the advantageous use of such material in an optically pumped laser. Embodiments of particular interest so made feasible are (1) C.W. operation in the oscillator mode, particularly at room temperature, and (2) amplification most expeditiously practiced at reduced temperature.

Detailed description of the invention is expedited by reference to the drawing, in which.

Figure 1:
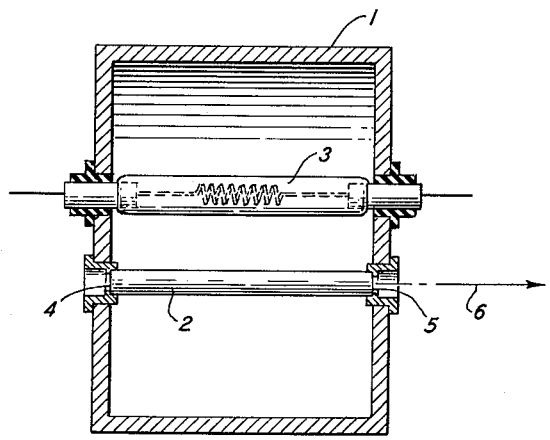
FIG. 1 is a cross-sectional view of a pump cavity and laser device in accordance with this invention which has been operated C.W. (continuous wave) at room temperature.

Referring again to FIG. 1, the apparatus depicted consists of elliptical cavity 1 containing $Nd^{3+}$-YAG laser 2 and pump 3, each at a focal point of the ellipse formed by cavity 1. Laser 2 is provided with coated ends 4 and 5, the former providing for complete, and the latter for partial, reflectance. Coherent emission, shown as arrow 6, emanates from partially reflecting end 5.

Figure 2:
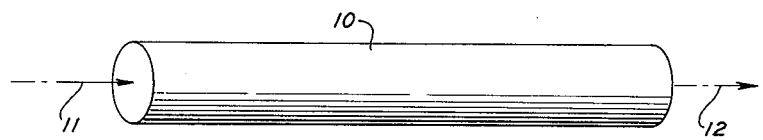
FIG. 2 is a plan view of a laser amplifier herein.

The device of FIG. 2, consisting solely of a rod 10 of $Nd^{3+}$-YAG, having flat, parallel, polished ends, is an amplifier which operates at a strong fluorescence line frequency for the particular temperature of operation. Coherent radiation 11, presumably produced by another $Nd^{3+}$-YAG laser device such as that of FIG. 1, enters at one end of amplifier 10, is amplified within the crystal and leaves at the other end, as represented by arrow 12. A pump such as pump 3 of FIG. 1, possibly together with a focusing means such as cavity 1 of FIG. 1, neither of which is shown, is also required. As has been indicated, a representative length for such a device, of the order of one or two inches, may result in several db gain at 77° K. At such temperature, this device is most advantageously operated at a frequency of 1.0639 microns, this incidentally representing a line shift of about 9 cm.$^{-1}$ upon cooling from room temperature.

Figure 3A:
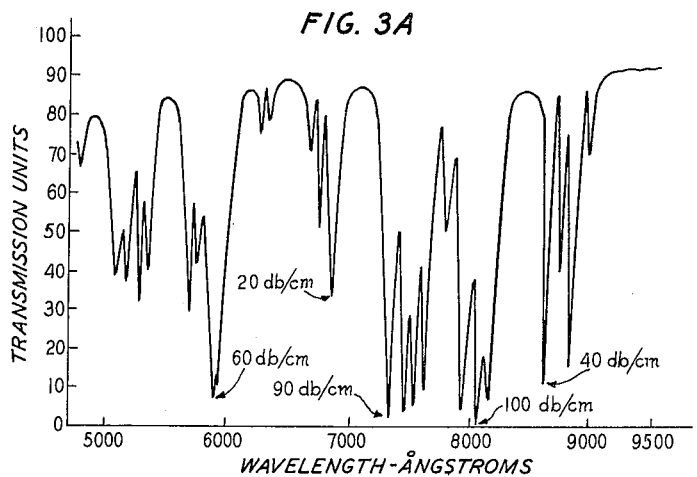
FIGS. 3A and 3B are absorption spectra for the systems $Nd^{3+}$-YAG and $Nd^{3+}-CaWo_4$, respectively.
Figure 3B:
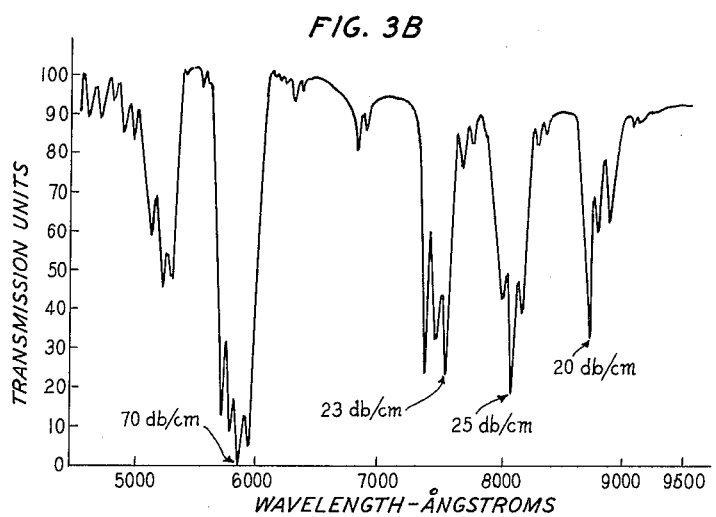

FIGS. 3A and 3B, as has been stated, represent those data primarily responsible for the prolonged experimentation culminating in the growth techniques which made this reported work possible. These figures are absorption spectra plotted in transmission units against wavelength in A. units. They represent spectra for $Nd^{3+}$-YAG and $Nd^{3+}$-$CaWo_4$, respectively, although FIG. 3B can be considered as more generally indicative of that type of spectrum associated with Nd in other reported hosts, for example Nd-Crown glass. Both figures are directly plotted on a double beam spectrophotometer using a photomultiplier to obtain absolute percent transmission.

For convenience, in FIGS. 3A and 3B the peak absorption values of concern are indicated in normalized terms of loss in db per centimeter for 3 atom percent Nd in either host. Study of FIG. 3B, the spectrum for the prior art tungstate material, reveals a marked absorption peak at about 5700–6000 A. units, and it is this absorption which has permitted the effective use of a mercury pump for the reported C.W. and pulsed operation of this system. The three absorption peaks occurring between 7500 A. and 9000 A. suggests the use of black body emission. However, such pumping expedient may result in an expected advantage only of the order of 25 percent by use of tungsten in lieu of mercury. Such advantage has, as indicated, been prevented by the unavailability of tungsten or other black body emitters capable of the required output.

The spectrum of FIG. 3A is unusual for Nd in providing for unusually strong absorption over the range of from about 7500 to about 9000 A. units. This material just as efficiently pumped by mercury by reason of the absorption at about 5800 A. units, is extremely well matched to black body emission. The use of such a pump as indicated has resulted in a measured advantage by a factor of 2.3.

It has been indicated that the materials utilized herein have a trivalent Nd content of from one-half to 10 atomic percent based on yttrium. While laser action may result at levels lower than the minimum indicated, one-half of one percent is considered an expeditious limit for practical operation. Use of material containing greater than maximum quantity of Nd indicated is unsuccessful due to greatly reduced fluorescence lifetime, presumably resulting from Nd–Nd interactions. Marked decrease in fluorescence lifetime is first observed for Nd content in excess of 6 atomic percent, and this concentration therefore represents a preferred maximum for the purposes of this description and particularly for C.W. operation. At lower levels, pump efficiency is sharply increased with increasing Nd concentration. A preferred lower limit of one percent is indicated.

Studied crystals found to be possessed of the requisite characteristics for operation in accordance with this description have been grown by pulling (the main advance required for this technique being the development of a system for heating which avoids rapid destruction of the crucible) and by spontaneous nucleation in accordance with a procedure invented by one of the inventors herein and another, and described and claimed in United States patent application Serial No. 313,672, filed October 4, 1963. In accordance with this latter procedure, large, optically perfect crystals are grown from a flux of lead oxide-lead fluoride-boron oxide. Fundamental studies conducted on a number of crystals grown by various techniques indicate that the desirable properties herein set forth are in no way associated with any particular growth technique but are inherently those of the composition. Crystals thus far found unsuitable have been found such primarily by reason of poor optical quality. In consequence, it is an additional requirement of this invention that the active crystal element have a phase distortion of less than two waves per cm. of path length and an optical loss less than 0.4 db/cm., both measured at the resonance line of concern.

It has been stressed that the characteristic most directly responsible for the studies culminating in this invention is the unusual absorption spectrum for this material. Advantage has been taken of this absorption characteristic by use of a quartz-iodine-tungsten lamp. This type of lamp has the output characteristic of tungsten with the quartz envelope merely permitting greater transmission and longer wavelength and with the iodine minimizing deposition of evaporated tungsten at locations other than on the filament itself and so prolonging lifetime. The attributes of this type of lamp are largely due to its availability and economy. It has been stressed that the absorption of $Nd^{3+}$-YAG is closely matched to black body emission at about 3000° K. A direct match is, of course, not necessary. It has been determined that minimum threshold corresponds with a brightness temperature of about 2000° K. for wavelengths between 7500 A. and 9000 A., and the minimum power limit may be stated in these terms. Outputs of 100 milliwatts and 500 milliwatts respectively are achieved in a ⅛ inch diameter by one inch length crystal by pumps producing average laser surface brightness temperatures of 2500° K. and 3200° K.

Although alternative procedures found useful in other reported laser experiments may be utilized, it has been found desirable to utilize multilayer dielectric reflectors on flat, parallel, polished ends for use of these devices as oscillators. Curved ends are, of course, equally feasible but may require some correction of the emission to improve parallelicity. Other techniques have the attendant characteristics associated therewith. It is, of course, apparent that operation of this system as an amplifier suggests the possibility of generation without coated ends. For any given pump level, this mode of operation is most successfully carried out at reduced temperature. In this connection, it should be noted that while oscillator action has been discussed largely in terms of room temperature operation, it, too, with or without reflecting ends, may be carried out at reduced temperature with the usual advantages accruing to this change in conditions.

The matter of operating temperature deserves some discussion. While it has been indicated that C.W. operation has been achieved at room temperature, this should not be considered limiting; in fact, C.W. operation has been achieved at 10 degrees above room temperature and can predictably result with increasing pump output and still higher temperatures. Line narrowing effects, the most important variation which is temperature dependent, are approximately exponential with decreasing temperature. While little advantage is indicated, for example, operation at zero degrees C., line narrowing is appreciable at 77° K. Still further improvement results at liquid helium. While operation at liquid helium is characterized by the usual difficulties, such as heat transfer due to the very low heat capacity of liquid helium, the near optimum line width may indicate operation at such temperature.

It has not been stressed that the advantageous characteristics of the system under discussion, while they most significantly suggest expeditious C.W. operation, may be utilized, also advantageously, for pulsed operation. Experiments carried out by the inventors herein have indicated pulsed thresholds at room temperature for $Nd^{3+}$-YAG containing 3 percent Nd of 3.8 and 2.0 joules for 1.4 cm. and 3.0 cm. rod lengths, respectively, as compared with 15 joules for a 1.5 cm. rod of optimum concentration $Nd^{3+}$-$CaWO_4$. Similar advantages are realized for semicontinuous operation.

The invention has been discussed in terms of a limited number of embodiments. Other laser devices have been reported, and still others have yet to be invented. All such devices dependent upon low threshold, high insertion gain, or high output, the last two particularly in the C.W. mode, may advantageously utilize the materials herein. The appended claims should be construed accordingly.

What is claimed is:

1. Laser comprising an active element consisting essentially of a single crystalline body of yttrium-aluminum garnet containing from one-half to 10 atomic percent of Nd based on the number of yttrium atoms and in which the said body has a phase distortion less than two waves per centimeter of path length and an optical loss less than 0.4 db/cm., both measured at the resonance line of concern.

2. Device of claim 1 in which the active element is rod shaped and in which both ends are coated in such manner that one is totally reflecting and the other is partially reflecting for electromagnetic energy of the order of one micron in wavelength.

3. Device of claim 1, together with associated pump means, the said means having an emission level such that a brightness temperature of at least 2000° K. obtains at the laser surface.

4. Device of claim 3 in which the said means is an essentially black body emitter.

5. Device of claim 4 in which the said means is a tungsten lamp.

6. Device of claim 3 in which the said means has an emission level such that a brightness temperature of at least 2500° K. obtains at the laser surface.

7. Device of claim 3 in which the said means has an emission level such that a brightness temperature of at least 3200° K. obtains at the laser surface.

8. Laser oscillator capable of C.W. operation at a minimum temperature of zero degrees C. comprising an active medium consisting essentially of substantially monocrystalline $Y_3Al_5O_{12}$ in which from about 0.5 percent to about 10 percent of the yttrium ions is replaced by trivalent Nd ions and pumping means comprising an essentially black body emitter for establishing a negative temperature state between a pair of optically connected energy levels of said trivalent Nd ions and in which the said active medium has a phase distortion less than two waves per centimeter of path length and an optical loss less than 0.4 db/cm., both measured at the resonance line of concern.

9. Device of claim 8 in which the said pumping means may result in an average brightness temperature on the surface of the said laser of at least 2000° K.

10. Laser amplifier comprising an active medium consisting essentially of substantially monocrystalline $Y_3Al_5O_{12}$ containing from about 0.5 atom percent to about 10 atom percent trivalent Nd ions based on the number of yttrium ions, pumping means consisting essentially of a black body emitter for establishing a negative temperature state between two optically connected energy levels of said trivalent Nd ions, means for introducing coherent radiation of a wavelength corresponding with a strong fluorescence line of the said medium, and means for extracting coherent energy from the said device and in which the said active medium has a phase distortion less than two waves per centimeter of path length and an optical loss less than 0.4 db/cm., both measured at the resonance line of concern.

No references cited.

ROY LAKE, *Primary Examiner.*

D. R. HOSTETTER, *Assistant Examiner.*